Patented Apr. 22, 1930

1,755,890

UNITED STATES PATENT OFFICE

WILLIAM BEACH PRATT, OF WELLESLEY, MASSACHUSETTS, ASSIGNOR, BY MESNE ASSIGNMENTS, TO DISPERSIONS PROCESS, INC., OF DOVER, DELAWARE, A CORPORATION OF DELAWARE

AQUEOUS RUBBER EMULSION AND PROCESS OF PRODUCING THE SAME

No Drawing.   Application filed April 11, 1923.   Serial No. 631,451.

This invention has relation to aqueous dispersions of crude or previously-coagulated rubber such as generally referred to in my application Serial No. 604,616, filed December 2, 1922.

I have discovered that it is possible to disperse or emulsify in water, not only crude rubber as pointed out in said application, but also crude rubber compounds such as are employed in producing vulcanized articles, in which there are compounded with the rubber the sulphur necessary for vulcanization and also those other materials which are usually compounded with rubber such as pigments, mineral rubbers, accelerators so-called, etc. When such rubber compounds are dispersed in water, they may be employed for a great variety of purposes, the emulsification or dispersion of such rubber compounds in water having no deleterious effect upon the subsequent vulcanization thereof.

I have also discovered that in producing an aqueous crude rubber dispersion, wherein oleic acid or other saponifiable agent is dissolved in the solvent in which the rubber or rubber compound is primarily dissolved, it is possible to saponify this agent to produce an emulsifying agent by certain alkalies other than ammonia, without coagulating the rubber, provided certain conditions be observed.

I have further discovered that, after an aqueous dispersion of rubber is produced by the aid of soap, it is possible to remove a large part of the non-rubber constituents including the water and the soap without causing the coagulation of the rubber, so that as a result I am able if desired to produce the dispersion in the form of a thick non-tacky aqueous paste, the consistency of the paste, however, depending upon the extent to which the water and the soap are removed.

As illustrating examples of products which may be produced and the processes which may be followed in producing them, I may cite the following. Crude rubber, for example, as obtained from *Hevea braziliensis*, is first dissolved in a solvent of the aromatic or carbocyclic series such as benzene ($C_6H_6$), toluol, xylol or other kindred solvent, together with a saponifiable agent such for example as a fatty acid or a mixture of the glycerides of the fatty acids. Into the solution is now gradually mixed, at ordinary temperatures, water containing a saponifying agent, such as ammonia or a suitable amine or substituted ammonia, with the result that an emulsifying agent, ammonium soap, is formed in situ in the solution. The addition of the ammoniated water is continued until a change in phase occurs, the water, which at first constitutes the disperse phase, ultimately constituting the continuous phase and the rubber and its solvent the disperse phase of the emulsion. Assuming that a liquid saponifiable agent be employed, this is all accomplished without the application of heat, but with continued agitation, first to ensure the dispersion of the saponifiable agent throughout the rubber solution, and then the dispersion of the ammoniated water throughout the solution, and, when the change in phase occurs, the dispersion of the rubber solution throughout the continuous aqueous medium. In the event that the saponifiable agent is semi-solid, as in the case of an animal or vegetable fat, or if solid, as in the case of stearic acid, it is preferable that the mass be heated sufficiently to ensure proper diffusion but not to such an extent as to "depolymerize" the rubber. Where ammonia is employed as the alkaline saponifying agent, it is, as a practical matter, desirable to employ it in excess of that theoretically necessary to saponify the saponifiable agent, as the excess ammonia tends to prevent coagulation of the rubber globules in the final product. I have found, however, that instead of using ammonia, I may employ as the saponifying agent an alkali which with the fatty acid or the glyceride will produce a water-soluble soap, provided the alkali is used in only sufficient quantities to effect the saponification or neutralization of the fatty acid without effecting the coagulation of the rubber. Thus, I may employ either caustic soda or caustic potash, but, as stated, care must be exercised not to have an excess of free alkali such as would effect the coagulation of the dispersed rubber.

Now by evaporation the volatile solvent is removed from the mass and recovered for reuse. In actual practice, this is preferably accomplished under a vacuum so as to avoid heating the mass to such a point as would tend to effect the coagulation of the rubber. As a result of this last step, there is produced a mass in which the rubber is dispersed in a continuous aqueous medium with the particles or globules of rubber approximating in size and shape the original globulues of the latex from which the coagulated rubber was derived. This mass, however, contains some soap in solution, and I have discovered, as previously stated, that it is possible to remove non-rubber constituents including the soap to a point where the quantity of soap remaining is practically negligible. This I accomplish in practice by subjecting the mass to centrifugation, a centrifugal machine of the character of a cream separator being suitable for the purpose. Inasmuch as the soap is dissolved in the aqueous medium, the removal of any predetermined quantity of water effects the removal of a proportionate amount of soap; but it is evident that, after a part of the soap has been removed, the mass may be again diluted with water and subjected to a second centrifugation and so on until the quantity of soap remaining in the mass is reduced to a quantity little if any more than that necessary to maintain the stability of the dispersion. Consequently I am able to produce an aqueous dispersion of rubber in water which is non-tacky, in which there is substantially no soap beyond that necessary to maintain the stability of the dispersion, and which may be spread on cloth by any suitable or convenient spreading machine such as is employed for spreading starch paste or cloth or the like. In actual practice the crude rubber is subjected to the usual milling operation before it is dissolved in the benzol, but of course the milling should not be carried on as to effect the "depolymerization" of the rubber.

As an example of the method of producing an aqueous dispersion of rubber containing sulphur and other compounding materials, suitable for application to cloth, the following may be given. It may be stated preliminarily that any suitable crude-rubber compound may be subjected to the process to be described, that selected being particularly for application to cloth to take the place of rubber compound which under standard practice is "frictioned" by calenders into the cloth. After 100 parts, by weight, of crude rubber have been subjected to the usual milling operation, there are now milled into the rubber 7 parts of flour of sulphur, 3 parts of zinc oxide, 2 parts of commercial "mineral rubber", and a sufficient amount of any commercial "accelerator" such as ethylidene aniline, depending upon the time and extent of the cure subsequently to be effected. The milling is continued until a homogeneous mixture is obtained. This mass is now cut into relatively small pieces, and, by means of a "rubber churn" is dissolved in about 400 parts of commercial benzol. The agitation is continued until the rubber has swollen and formed a maximum solution with the benzol. The sulphur and mineral rubber dissolve in the benzol but the pigment is in the solvent in the form of a fine suspension. During this action, apparently the globules of rubber, which were previously coagulated, separate and swell greatly. I now add about 10 parts of a saponifiable material, preferably oleic acid, although sulphonated oil or a vegetable oil may be employed if desired. This is thoroughly stirred into the mass and is dissolved by the benzol and is more or less absorbed by the rubber globules.

Water, containing a saponificating agent, e. g. ammonia, is now slowly and gradually added to and stirred into the rubber solution until after a change of phase has occurred and the water has become the continuous phase of the emulsion. In the event that ammonia is employed as the saponifying agent, in order to compensate or allow for evaporation, one uses about double the quantity theoretically required to saponify or neutralize the fatty acid of the saponifiable agent. If, however, other alkali, such as caustic soda or caustic potash be employed, care must be exercised as previously stated not to use it in such excess as to effect the coagulation of the rubber; and, in the example given, there would be added to the water approximately 0.705 parts of caustic soda,—the parts all being by weight. These operations may all be carried on at ordinary temperatures.

The mass produced as last described now has the benzol removed therefrom preferably by vacuum distillation at a relatively low temperature, leaving the rubber globules and the compounding materials dispersed in the water. For some purposes it is desirable to remove more or less of the soap and a portion of the water, and to that end the mass is placed in a centrifuge and subjected to centrifugation. A centrifugal machine of the character of a cream separator may be employed in practice for this purpose. After the separation of water and soap, which may be effected several times or in several steps by diluting with water the resulting rubber diffusion, a thick pasty mass may be produced having the general character of a thick smooth mud formed of smooth clay and water. It is evident, however, that the operation of the machine may be so controlled as to produce a rubber dispersion of a thinner consistency if desirable.

The pasty mass, produced as a result of the centrifugation, is homogeneous, non-tacky, spreads evenly, and does not coagulate on standing, nor do the solids separate from the water in commercial application.

The dispersed aqueous compound may now be spread upon cloth or paper by any commercial spreading machine, such as a "back filler," so-called, employed in spreading starch paste on fabric. In commercial practice, the thick aqueous dispersion is spread upon and pressed into the cloth, penetrating the interstices and pores of the cloth much as a starch paste permeates a fabric. After the cloth has been treated, it is now subjected to a drying operation for the removal of the water, and the resultant product is one which does not differ materially or substantially from a cloth frictioned with rubber by calenders in the ordinary manner; in fact, it is my observation that the two cannot be distinguished. The fabric may be "skin coated" with rubber and subjected to vulcanization.

It is quite evident that a rubber-compound dispersion of the character herein described may be used for a great variety of purposes. It may be added to cellulosic or other fibers in a beating engine for the manufacture of paper, box board, container board, leather board, and other sheet material commonly made on a paper machine, and has the advantage that it may be subjected to heat and pressure for the vulcanization of rubber compound. Inasmuch as the emulsion is non-tacky, it lends itself admirably to the manufacture of fibrous materials on a paper machine. The aqueous dispersion of the rubber compound may be employed for the treatment of fiber, yarn, thread, cords or ropes, and also for the treatment of felt and other fabrics.

I have observed the phenomenon that, while the rubber globules are in the presence of benzol, they are swollen to abnormal size; but that, when the benzol is completely removed from the aqueous emulsion, the rubber globules resume apparently their original size and shape but without coagulation. Consequently a much more highly concentrated rubber mass may be produced than where the rubber is merely dissolved in benzol.

I desire to make it clear that the example herein given of the dispersion or emulsion in water is not limited to the particular ingredients or the proportions cited in the example. It is evident that I may employ other pigments than zinc oxide, may omit "mineral rubber" or employ a substitute therefor, or in fact may add other compounding materials, as may be demanded by the commercial practice in any factory. Thus there may be mechanically compounded with the crude rubber any of such materials as resins, oils, the so-called oil substitutes, glue, dyes, and other products which are useful in the art, and the "rubber compound" thus produced dispersed in water according to the process herein described.

What I claim is:

1. A process of emulsifying previously-coagulated crude rubber in water, which comprises dispersing the rubber in the form of rubber globules in an aqueous medium with soap as the dispersing or emulsifying agent, and then separating soap therefrom, leaving the globules of the size and shape of those of the original latex dispersed in the water.

2. A process of emulsifying previously-coagulated rubber in water, which comprises dissolving the rubber in a volatile solvent, together with a saponifiable body, mixing water and an alkali therewith to form soap in situ in the solution and to form an aqueous rubber emulsion, removing the solvent from the emulsion, and removing soap therefrom.

3. A process of emulsifying previously-coagulated crude rubber in water, which comprises dispersing in an aqueous medium the rubber, in the form of rubber globules of the size and shape of those of the latex from which the crude rubber was derived with soap as the dispersing or emulsifying agent, and then separating soap and water therefrom without coagulating the rubber globules.

4. A process of dispersing a vulcanizable crude rubber compound in water, which comprises dissolving the rubber and other soluble components of said compound in a volatile solvent with the aid of a water-soluble soap, dispersing the components of said solution in water, removing the solvent, and removing soap from the mass.

5. A process of dispersing a vulcanizable crude rubber compound in water, which comprises mechanically compounding sulphur with crude rubber, dissolving the mass in a volatile solvent, dispersing the rubber and sulphur solution in water by the aid of a water-soluble soap, removing the solvent, and removing soap from the resulting emulsion.

6. A process of dispersing a vulcanizable crude rubber compound in water, which comprises mechanically mixing crude rubber, sulphur and a pigment to form a homogeneous mass, mixing said mass and dissolving the soluble components thereof in a volatile solvent, dispersing the product in water with the aid of a water-soluble soap, and removing the solvent and soap,—leaving the rubber, sulphur and pigment dispersed in the water.

7. A process of emulsifying a vulcanizable crude rubber compound, which comprises dissolving the soluble components of said compound in a volatile solvent, emulsifying the same by means of a dispersing agent in an aqueous vehicle, removing the solvent, and removing sufficient water to leave a smooth non-tacky paste in which the crude rubber is dispersed in globules approximately the rubber globules of latex.

8. A process of emulsifying a vulcanizable crude rubber compound, which comprises dissolving the soluble components of said compound in a volatile solvent, emulsifying the same in an aqueous vehicle with the aid of a soluble soap, removing the solvent, and removing water and soap, thereby producing a thick smooth non-tacky paste in which the components of the original compound are in a state of fine dispersion.

9. A process of emulsifying a vulcanizable crude rubber compound, comprising a mechanical mixture of crude rubber, sulphur, pigment and an "accelerator", which comprises mixing the same with and dissolving the soluble components of said mass in a volatile solvent, emulsifying the resulting product in water with a colloidal emulsifying agent, and removing the solvent and a portion of the emulsifying agent, leaving the components of said compound finely dispersed in the water.

10. A process of emulsifying crude rubber, which comprises dissolving such rubber in a volatile solvent together with a saponifiable material, gradually mixing therewith water containing an alkali capable of neutralizing such saponifiable material to form a water-soluble soap without coagulating the rubber, until after a change of phase occurs whereby the rubber is dispersed in the water, and then removing the solvent.

11. A process of emulsifying crude rubber, which comprises dissolving such rubber in a volatile solvent together with a saponifiable material, gradually mixing therewith water containing an alkali capable of neutralizing such saponifiable material to form a water-soluble soap without coagulating the rubber, until after a change of phase occurs whereby the rubber is dispersed in the water, and then removing the solvent and a portion of the soap.

12. A process of dispersing previously-coagulated unvulcanized rubber in water, which comprises dispersing the rubber in water in the form of substantially uniform rubber globules of the size and shape of those of the latex from which the rubber is derived, with a hydrophilic emulsifying agent, and then separating a portion of such agent and water therefrom without coagulating the dispersed globules.

13. A product comprising previously-coagulated rubber dispersed as minute particles in water containing a hydrophilic colloid, and from which non-rubber constituents, including hydrophilic colloid unnecessary to the stability of the dispersion have been removed without coagulation of the rubber particles.

14. A product comprising previously-coagulated rubber dispersed as minute particles in water containing a hydrophilic colloid, and from which non-rubber constituents, including hydrophilic colloid and water have been removed without coagulation of the rubber particles.

15. A product comprising previously coagulated rubber dispersed as minute particles in water containing soap, and from which soap has been removed without coagulation of the rubber particles.

16. A product comprising previously-coagulated rubber dispersed as minute particles in water containing a water-soluble soap, and from which water has been removed along with soap without coagulation of the rubber particles.

17. A process which comprises dispersing rubber as minute particles in an aqueous medium containing a hydrophilic colloid in excess of that necessary to the stability of the dispersion, and then removing non-rubber constituents, including hydrophilic colloid, from the dispersion without coagulating the rubber particles.

18. A process which comprises dispersing rubber as minute particles in an aqueous medium containing a water-soluble dispersing agent, and then removing water along with said agent from the dispersion without coagulating the rubber particles.

19. A process which comprises incorporating a dispersing agent into a mass of rubber, and gradually adding water until a change of phase takes place and the rubber disperses as minute particles in the aqueous medium, and then removing non-rubber constituents from the dispersion without coagulating the rubber.

20. A process which comprises incorporating a water-soluble soap into a mass of rubber, and gradually adding water until a change of phase takes place and the rubber disperses as minute particles in the aqueous medium, and then removing water along with soap from the dispersion without coagulating the rubber particles.

21. A process which comprises dispersing rubber as minute particles in an aqueous medium containing a dispersing agent, and then centrifuging the dispersion to remove water and dispersing agent therefrom.

In testimony whereof I have affixed my signature.

WILLIAM BEACH PRATT.